United States Patent Office 3,198,731
Patented Aug. 3, 1965

3,198,731
METHOD OF TREATING OIL ON THE SURFACE OF WATER
Earl R. De Lew, Corte Madera, Calif., assignor to Yosemite Chemical Co., San Francisco, Calif., a corporation of California
No Drawing. Filed Sept. 20, 1961, Ser. No. 139,362
12 Claims. (Cl. 210—42)

This invention relates to treatment of oil slicks and spills on the surface of still or moving bodies of water, and more particularly to the removal of petroleum and fuel oil slicks and spills from harbors, bays, lakes, rivers or the like.

To avoid contamination of such bodies of water, removal of oil spills from the surface of the water is most important. Spills sometimes occur when oil is transferred from tankers to ships for refueling or other purposes, when it is discharged from tankers into refinery storage tanks on shore, when valves are opened or transfer lines break accidentally during these operations, and when there are leaks from tanks on ships or ashore. Water contaminated with petroleum or fuel oil may initially form an oil slick of approximately three to four inches in depth which if not promptly removed spreads rapidly in the course of three or four days over the surface of the water to approximately .01 inch in depth.

In the past, removal of this oil has been attempted by the application of oil absorbing materials such as hay or straw to the oil surface while traveling through the slick in boats and distributing the hay over the entire surface of the slick. The oil adheres to the floating straw or hay, and the hay is collected by suitable means such as pitch forks and removed from the area. Such a method is not at all to be desired because it is inefficient, costly, time consuming and requires large amounts of the hay where the slick covers a large area. Also, it does not stop the slick from spreading during the removal operation.

Surface active agents have also been employed to reduce surface tension over the oil slick area, either the anionic types such as alkyl aryl sulfonates, and other sulfonate soaps or any of the numerous non-ionic surfactants known to the trade, in an attempt to disperse the oil into the water so that it disappears from the surface. This method does not result in actual removal of the oil, but merely breaks it up in finer particles, contaminating the water and thus creating a serious threat to marine fauna and flora. Also, such method is rather costly as far as the materials used are concerned.

The principal object of the present invention is to provide a simple, rapid, efficient, yet inexpensive improved method for preventing the spread of oil on and its removal from the surfaces of still or moving waters, which obviates shortcomings of methods heretofore used. Other objects and advantages of the invention will become apparent from the following description.

Summarizing the invention, it comprises subjecting the oil slick on the water to an agent which will congeal the oil to a substantially stiff mass or gel that will stop the oil from spreading and that can be mechanically handled by physical means, such as fine mesh nets or screens which will hold hold the congealed oil but allow water to drain through. Perforated clam shell buckets can also be employed for removal of the stiffened oil.

In greater detail, any suitable congealing agent can be employed, for example, molten materials which congeal when in contact with the cold oil layer at ambient temperature on the water. Of materials of this type, molten wax, such as paraffin or slack wax, or molten soap solutions which are solid at room temperature are satisfactory. Materials of this type entrap the oil slick when applied to the water and congeal therewith, thus enabling mechanical removal. Since these materials generally require initial heating to bring them to a molten state before application to the water, a more desirable and consequently preferred type of congealing agent is any suitable material which is liquid at atmospheric temperature, but which will form a relatively stiff water-in-oil gel or emulsion when applied to the oil slick in contact with the water. The term "water-in-oil" is employed in contradistinction to an "oil-in-water" emulsion produced by the previously mentioned dispersing and emulsifying agents.

The most desirable gel or emulsion forming agents for the particular purpose are soaps of the natural fatty acids contained in wool grease. The natural wave motion or turbulence of the water generally provides sufficent agitation for converting into a relatively stiff water-in-oil gel or emulsion the oil slick to which these lanolin soaps have been added. To insure sufficient agitation and mixing of the liquid congealing agent with the oil and water, particularly with viscous oils such as lubricating oils and heavy fuel oils, it is desirable to apply the congealing agent over the oil slick by means of a non-atomizing spray with sufficient pressure to penetrate the oil film. Lanolin liquified by heating also can be used provided vigorous mechanical agitation, such as paddling, is applied to the oil surface after the lanolin is applied thereto. However, its gelling action is much slower than that of its soaps.

Generally speaking, all liquid fatty acid soaps or liquid solutions of such soaps, which are derived from divalent metals, such as calcium, strontium, barium, magnesium, zinc and manganese, as well as certain trivalent metals, such as aluminum and iron, are characterized by their ability to form water-in-oil emulsions. This applies also to divalent and trivalent metal soaps of the so-called naphthenic acids, which are not derived from fats, but from petroleum and have a more complex structure than the fatty acids.

The formation of gels of all the above mentioned soaps in contact with water is based on their ability to form water-in-oil emulsions. However, the consistency of the gels formed varies with the type of metal and fatty acid involved when applied to the oil slick in the same manner as the wool grease soaps. The soaps of the alkaline earth metals, comprising calcium, strontium, barium, as well as magnesium in mixture with petroleum oils, produce the stiffest gels in contact with water.

Such water-in-oil emulsion forming soaps can be very readily made by reacting the desired metal oxide or hydroxide with the desired fatty acid or acids by application of heat and stirring in a conventional manner. The resultant soaps are then made into a suitable liquid soap stock by dissolving the same in a suitable diluent such as high flash petroleum solvents, or conventional diesel oil, in suitable proportions in the range of about 1 part of soap to about 1 to 10 parts of diluent depending on the particular soap and solvent although this range is not critical. The following is an example of a suitable typical stock formulation of a soap of wool grease, which is capable of forming a stiff gel in the presence of water, shortly after having been added to an oil slick on the water surfaces:

*Example I*

Parts by weight
Calcium soap of wool grease fatty acids _____ 1
High flash petroleum diluent (approximate boiling range; 400–600° F. at 760 mm.) (approximate flash point, 150° F.) _____ 2

The calcium soap of wool grease fatty acids can be readily formed by reacting about 40 lbs. of calcium oxide and 800 lbs. of degras (crude lanolin) at a temperature of about 300° F. for about one-half hour while simultaneously stirring.

As previously mentioned, when an oil spill occurs, it spreads rapidly over the water. Therefore, the most expeditious manner of treating the oil slick is first to travel around the spill or slick in a boat and apply the congealing agent onto the floating oil adjacent the perimeter or edge of the spreading slick as rapidly as possible. The action of the congealing agent at the edge of the slick causes the slick to stiffen or gel rapidly at the periphery and thus form a barrier dam which prevents further spreading of the oil. Then, the congealing agent is applied uniformly over the interior of the slick to congeal the remainder of the oil confined within the barrier dam.

If the oil slick area is large, such interior of the slick can be treated from a boat travelling through the slick, as many times as is required to apply the agent substantially uniformly over the area of the slick within the barrier dam. However, if it is not necessary to confine the slick by first forming the aforementioned barrier dam, such as in the case of a slick over a small area which can be readily reached or where the oil slick has been on the water a relatively long time and has ceased spreading, the congealing agent can be applied initially directly over the entire surface of the spill.

As previously mentioned, the liquid congealing agent is desirably applied by means of spraying from any suitable spray nozzle at a sufficient pressure to cause the spray to penetrate through the oil slick and come in contact with the underlying water so as to promote rapid congealing of the oil. A non-atomizing spray nozzle, such as a conventional hose nozzle, is preferred to insure that the agent will not float on the oil but will penetrate the same even though the oil may be a relatively thick layer on the water. Also, the sprap provides agitation and better contact between the congealing agent, oil and water, which enhances congealing of the oil. A suitable spray pressure is about 40 to 60 lbs. per square inch. However, the pressure is not particularly critical, as long as it is sufficient to cause the spray to penetrate through and agitate the slick with the water.

When a material such as molten wax is applied as the congealing agent, suitable means has to be provided on the spraying boat to heat the container for the wax to maintain the wax in liquid molten condition. For this reason, water-in-oil emulsion or gel forming soaps which are liquid at atmospheric or ambient temperature and do not require heating facilities, are more suitable. These soaps rapidly form the water-in-oil emulsion or gel under agitation provided by the spraying and the wave motion of the water. The gel formation is more rapid in the presence of sea water than fresh water probably which is due to the presence of salts in sea water.

The amount of congealing agent applied is not critical, it being merely necessary to apply sufficient of the congealing agent to insure that all the oil slick has stiffened to a mass that can be readily bodily removed from the water by mechanical means. This can be readily determined by visual observation. Should the oil be insufficiently stiffened after a first application of the congealing agent, the operation should be repeated.

Usually, about one-half the amount by weight of the preferred type of congealing agent of Example I based on the amount of oil spill, applied over the entire area of the spill and along the edge or perimeter thereof will suffice to effect the desired congealing. However, excess amounts do not do any harm but merely add to the cost of material. Any portion of the spill to which the preferred congealing agent of Example I is applied, will stiffen to a mass that can be physically removed in about 10 to 90 minutes after application of the agent. Other of the aforementioned water-in-oil emulsion forming agents take slightly longer. With molten wax, congealing thereof with the oil occurs almost instantly, as the wax solidifies in contact with the cold oil on the water surface, converting the oil slick to a gel-like mass.

After the oil spill has been stiffened by the congealing agent, it can be readily physically removed by travelling through the spill with a boat, and separating the stiffened spill from the water by means of fine mesh nets or screens, or perforated clam shell buckets as previously stated. In this connection, it is not necessary to wait until the entire spill has been stiffened before removing the same. For example, in the case of a spill covering a large area, one or more parties can be congealing portions of the same, while others can be removing portions that have already congealed.

The following is illustrative of a typical example of oil slick removal employing the preferred water-in-oil gelling or emulsifying agent of Example I.

*Example II*

20 barrels (about 860 gallons) of commonly employed fuel oil, known as "Bunker C" which is a relatively thick oil, when spilled on relatively calm salt water in a harbor, will rapidly form a circle of about 50 ft. in diameter and about one-eighth inch thick. Travelling promptly in a boat around the perimeter of this spill while simultaneously spraying the edge of the spill with the congealing agent by means of a garden type hose nozzle at about 45 lbs. pressure, results in formation of a barrier dam of such agent in about 5 minutes, preventing further spreading of the oil.

Then while travelling through the remainder of the spill and continuing the spraying over the entire area of the spill within the barrier dam, all portions of the remainder contacted by the sprayed congealing agent begin to congeal rapidly in about the same time, and will be completely gelled within 90 minutes. The amount of material applied is about one-half by weight of the amount of the oil spill, namely, about 425 gallons. The stiffened spill is separated from the harbor water by an ordinary fine mesh wire screen of about 60 mesh which permits drainage of the water back into the harbor as the screen is lifted out of the water. After drainage of the water, the stiffened mass collected by the screen is dumped into suitable refuse containers on the boat.

*Example III*

The procedure of Example II can be followed employing crude paraffin wax of a minimum melting point of about 150° F. which is maintained in molten condition in a tank on the boat by suitable heating means. About the same amount of material is required for congealing the oil slick formed by the 20 barrels of oil, as in Example II.

I claim:

1. The method of treating oil floating on the surface of a body of water to enable subsequent removal thereof and thus obviate contamination, which comprises applying to said oil while it is floating on the water an agent which congeals the oil while still floating on the surface of the water.

2. The method of treating an oil mass floating on the surface of a body of water to enable subsequent removal thereof and thus obviate contamination, which comprises first applying adjacent an edge of the floating mass an agent which congeals the oil adjacent said edge and forms a floating barrier dam on the surface of the water preventing substantial spreading of the oil beyond said edge, and then applying such congealing agent over said floating mass confined by said barrier dam to congeal such confined oil while still floating on the surface of the water.

3. The method of removing an oil spill floating on the surface of a body of water which comprises spraying onto the oil while it is floating on the water a liquid agent which congeals the floating oil on the surface of the water, and after floating oil has congealed separating the congealed mass from the water surface.

4. The method of treating oil floating on the surface of a body of water to enable subsequent removal thereof which comprises spraying onto the oil while it is floating on the water a liquid water-in-oil emulsion forming agent which congeals the floating oil in the presence of the water and on the surface thereof.

5. The method of treating oil floating on the surface of a body of water to enable subsequent removal thereof which comprises spraying onto the oil while it is floating on the water a liquid metal soap of the natural acids contained in wool grease which forms a floating water-in-oil emulsion in the presence of the water and on the surface thereof.

6. The method of removing an oil spill floating on the surface of a body of water which comprises first spraying about the perimeter of the floating oil a liquid metal soap of the natural acids contained in wool grease which forms a water-in-oil emulsion to congeal the floating oil in the presence of the water and on the surface thereof and provide a floating barrier dam about said perimeter preventing substantial spreading of the oil, then applying said liquid soap over the interior of said spill within said barrier dam to form a water-in-oil emulsion and congeal the remainder of the floating spill on the surface of the water, and finally separating the floating congealed mass from the water surface.

7. The method of claim 3 wherein the congealing agent is molten wax.

8. The method of preventing substantial spreading of an oil spill floating on the surface of a body of water which comprises applying adjacent an edge of the floating spill an agent which congeals the oil in the presence of the water and on the surface thereof and forms a floating barrier dam at said edge.

9. The method of claim 8 wherein said congealing agent is a liquid metal soap of the natural acids contained in wool grease.

10. The method of claim 8 wherein said congealing agent is molten wax.

11. The method of removing an oil slick floating on the surface of a body of water such as harbors, bays, lakes, rivers or the like which comprises selectively spraying onto said slick form a moving applicator, a liquid agent which congeals the floating oil on the surface of said water without dispersion of the oil into the body of said water, and after the floating oil has congealed separating the resultant floating congealed oil from the surface of the water.

12. The method of removing an oil slick floating on the surface of a body of water such as harbors, bays, lakes, rivers or the like which comprises selectively spraying onto said slick at ambient temperature from a moving applicator a liquid congealing agent which forms a water-in-oil emulsion with the oil in the presence of water, said spraying being applied with pressure to cause the agent to penetrate the floating oil and agitate the slick with the water whereby the floating oil is congealed on the surface of said water without dispersion of the oil into the body of said water, and after the floating oil has congealed separating the resultant floating congealed oil from the surface of the water.

References Cited by the Examiner
UNITED STATES PATENTS

| | | | |
|---|---|---|---|
| 2,330,508 | 9/43 | McColl | 210—242 |
| 2,762,775 | 9/56 | Foehr | 252—59 X |
| 2,915,467 | 12/59 | McCormick | 252—39 |
| 3,033,787 | 5/62 | Morway et al. | 252—39 |
| 3,046,233 | 7/62 | Levy | 210—42 X |

REUBEN FRIEDMAN, *Primary Examiner.*

HERBERT L. MARTIN, *Examiner.*